T. J. CALLERY.
CAR CONSTRUCTION.
APPLICATION FILED SEPT. 25, 1920.
1,400,140.
Patented Dec. 13, 1921.
6 SHEETS—SHEET 1.
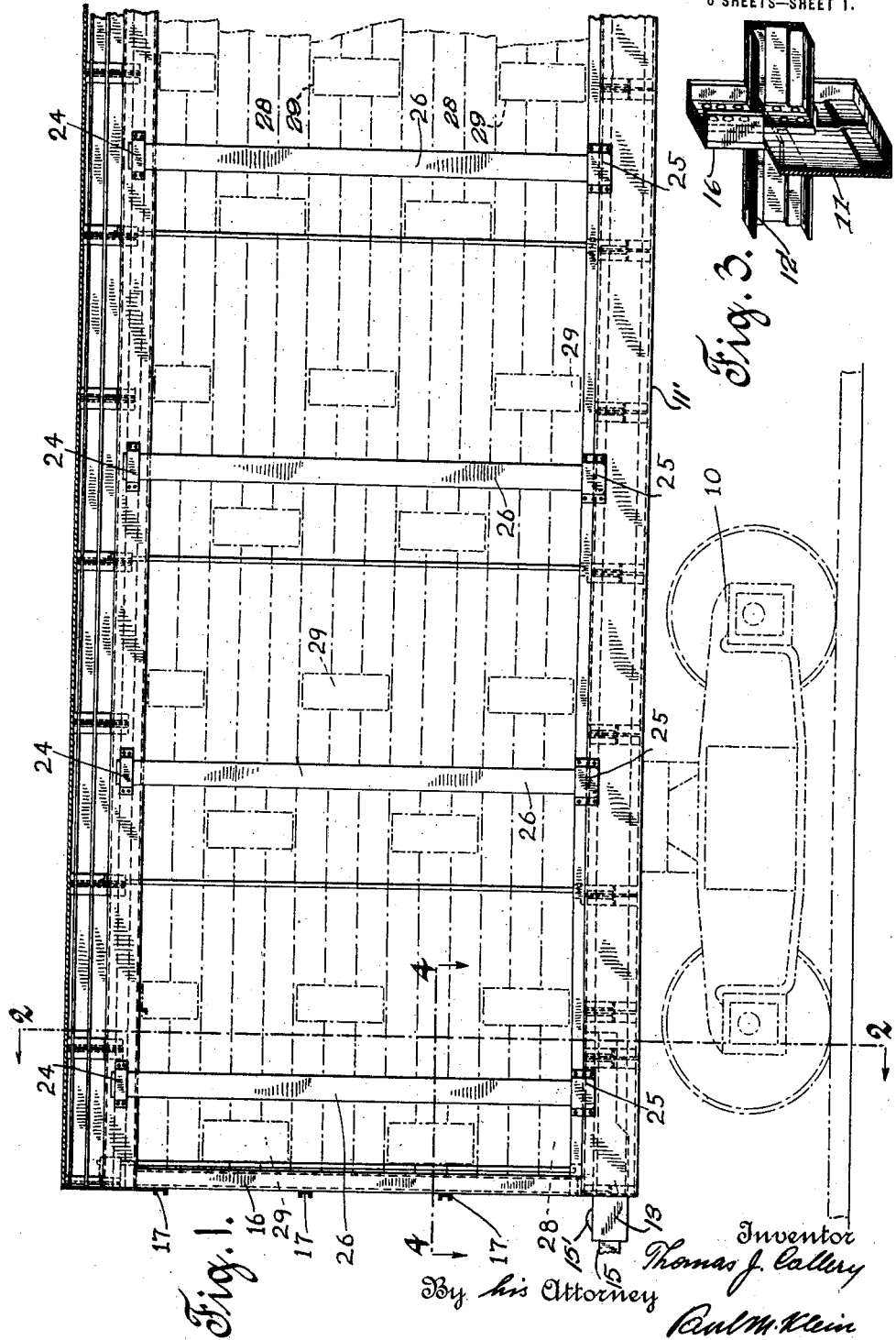

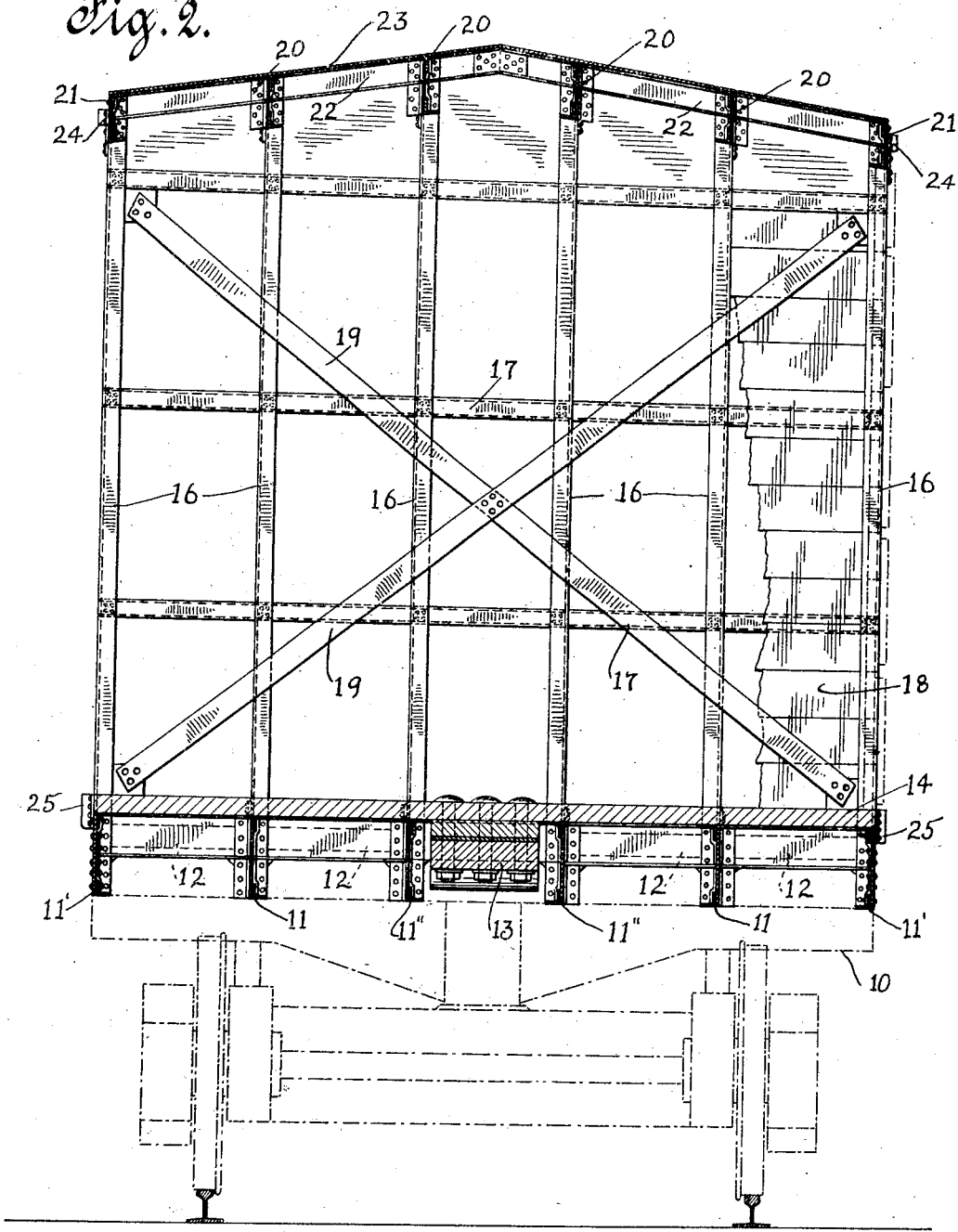

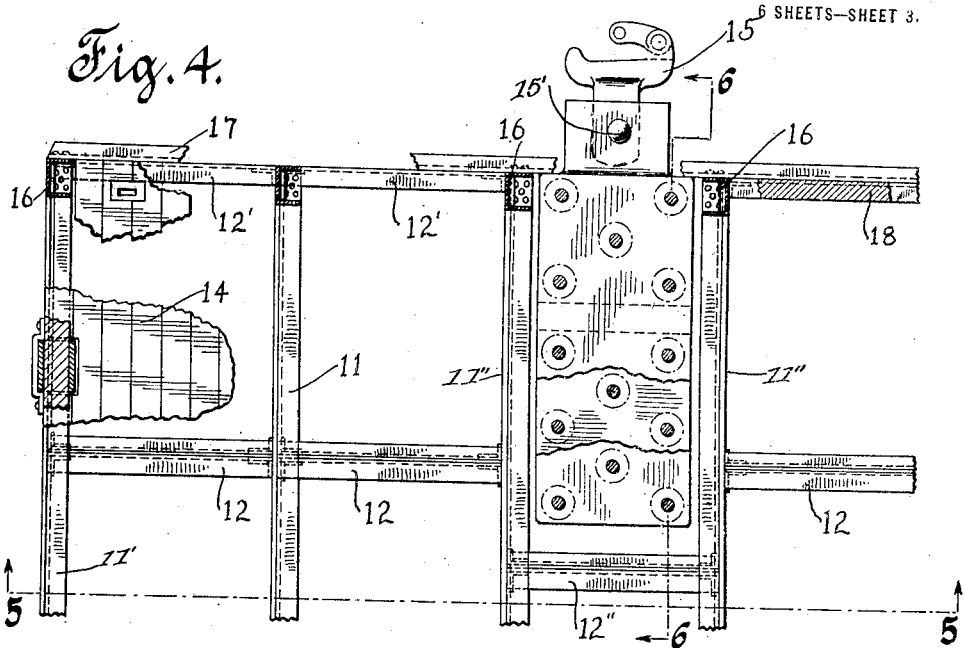
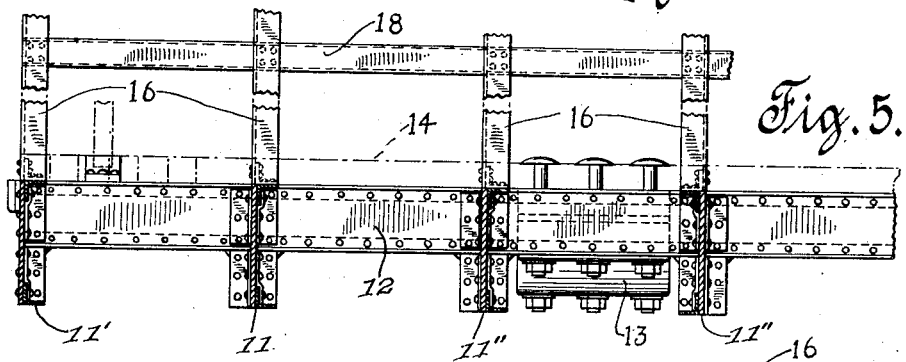
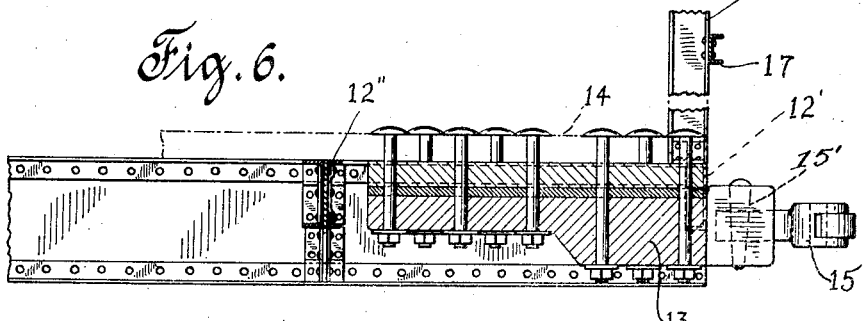

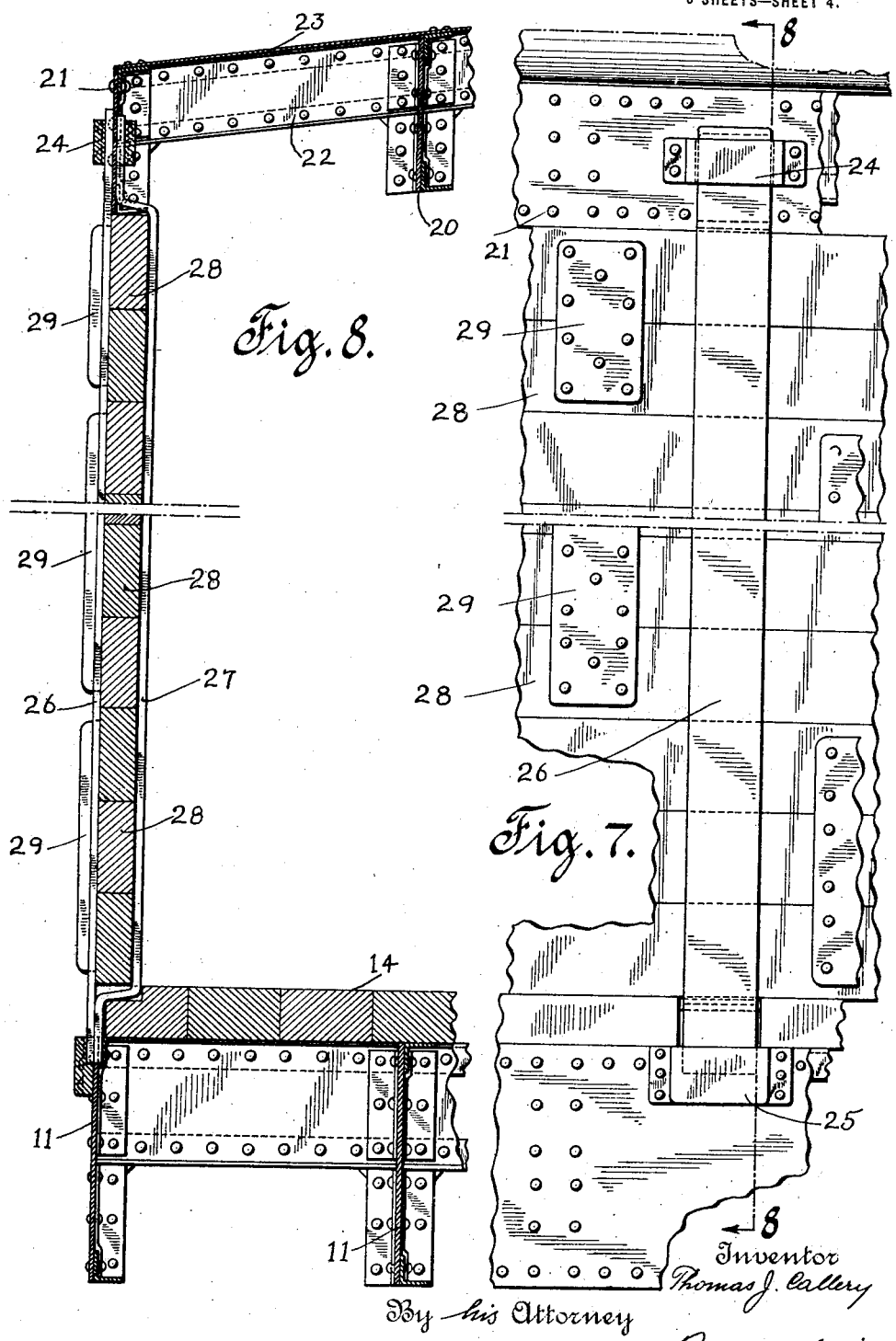

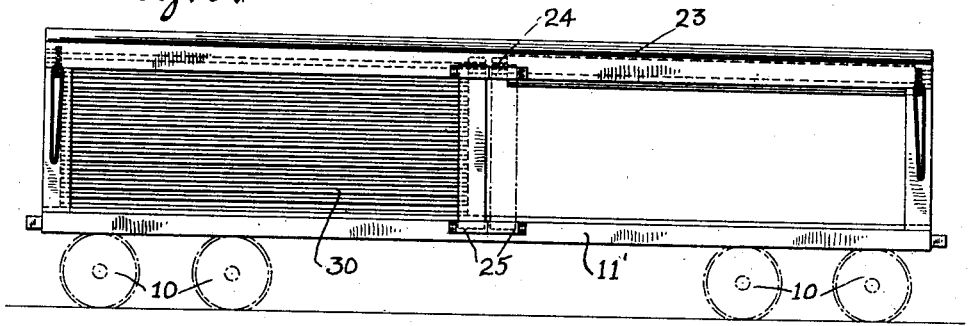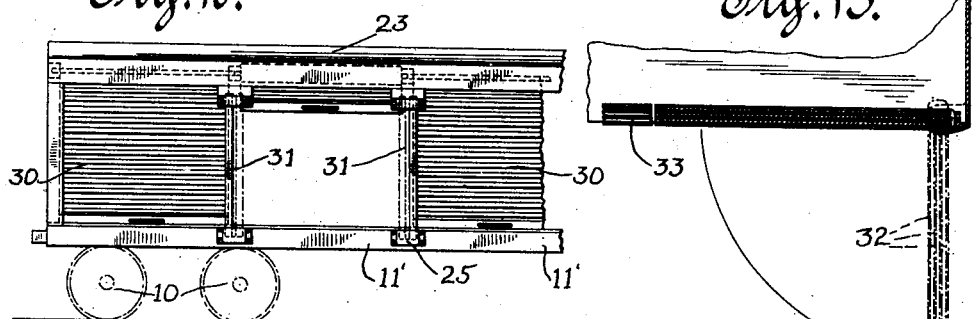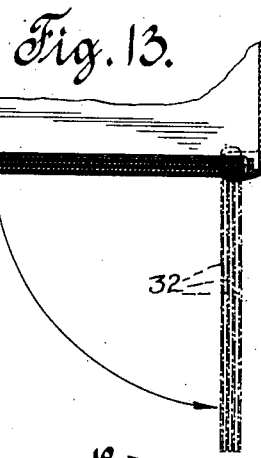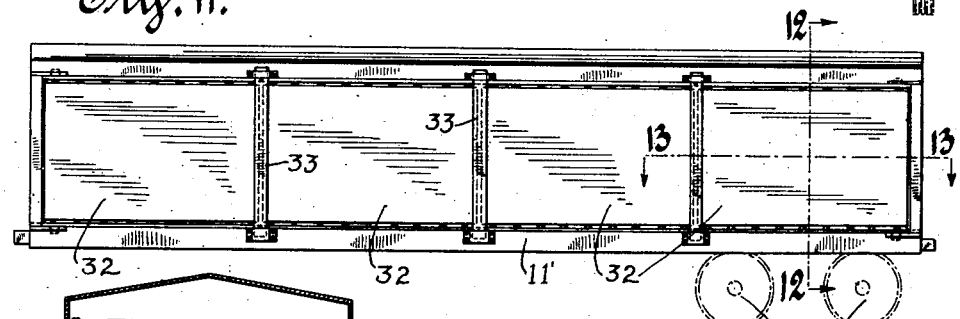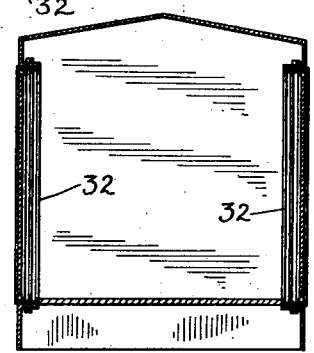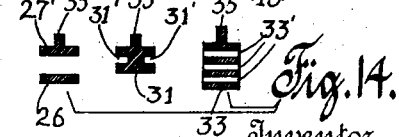

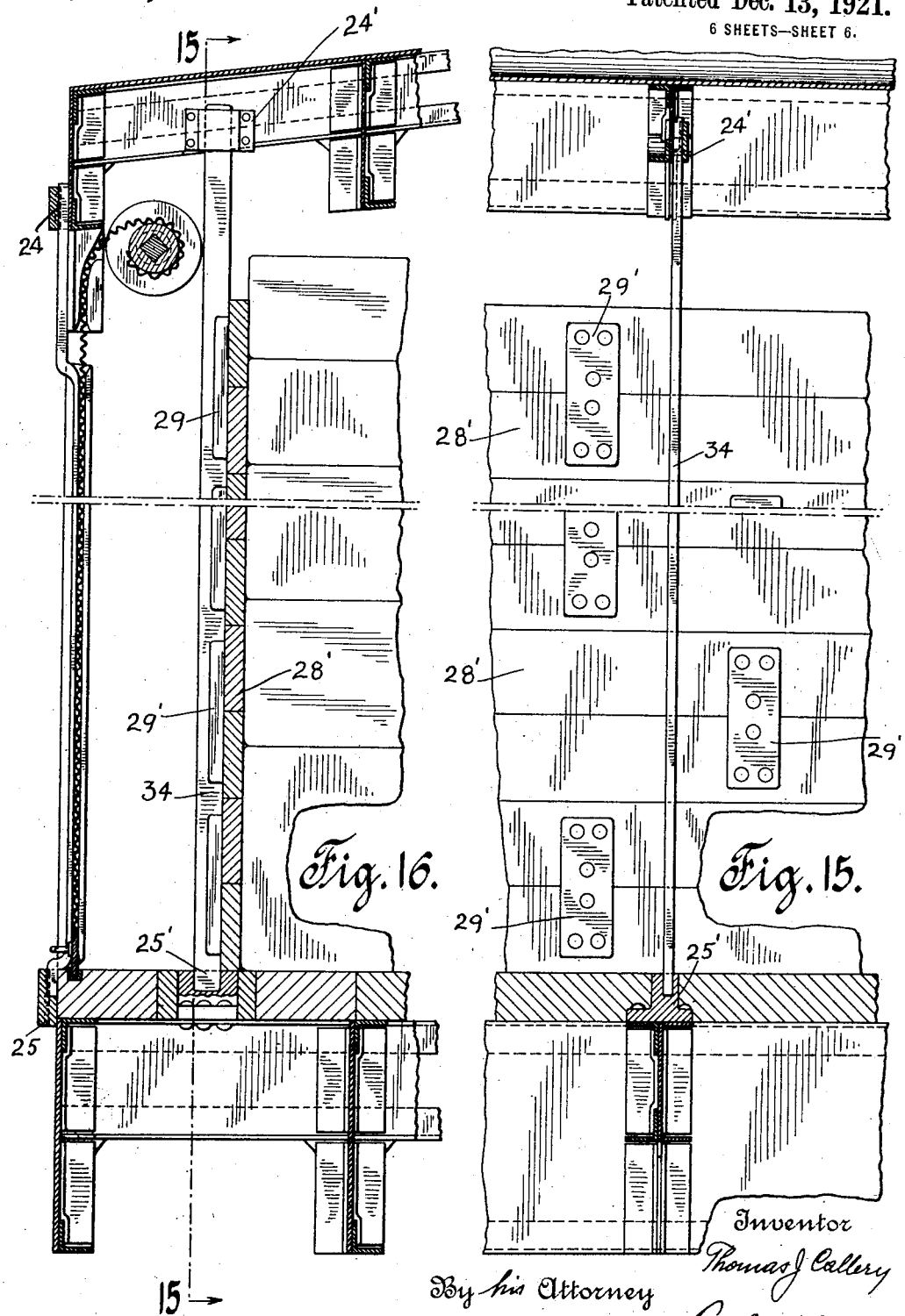

UNITED STATES PATENT OFFICE.

THOMAS J. CALLERY, OF JERSEY CITY, NEW JERSEY.

CAR CONSTRUCTION.

1,400,140.  Specification of Letters Patent.  Patented Dec. 13, 1921.

Application filed September 25, 1920. Serial No. 412,781.

*To all whom it may concern:*

Be it known that I, THOMAS J. CALLERY, a citizen of the United States, and resident of Jersey City, in the county of Hudson and State of New Jersey, have invented certain new and useful Improvements in Car Construction, of which the following is a specification.

This invention relates to car construction in general, and particularly to the kind adapted for use on railways.

The primary objects of my invention are to provide a car body adapted to be placed upon and carried by conventional car trucks and facilitating the loading into the car of freight from all points at both of its sides, means whereby the sides of the car may be closed in sequence as the loading progresses or after the car is loaded, and means for preventing the loaded cargo from shifting and from interfering with opening or closing of the laden car.

Other objects of my invention are to provide a car structure comprising a permanent combination of a rigid under-frame, a truss roof and end structures, a series of removable studs, posts or braces, and means provided at and near the sides of the roof and the under-frame and in the floor of the car for receiving said studs.

Another object of my invention is to provide, in connection with such car structure, removable blocking for holding the freight within the car, and glidable, rollable or otherwise operated sidings or doors adapted to close the freely open sides of the car after it is loaded.

A further object of my invention is to construct, in connection with such car construction, braces, posts or studs adapted to engage or be engaged by said blocking and sidings mentioned above.

The foregoing and still other objects will be more fully apparent from the following description and the accompanying drawings, forming part of this specification, in which:

Figure 1 is a side elevation of a portion of a car body showing one preferred form of my construction.

Fig. 2 is a cross sectional view taken on line 2—2 of Fig. 1, and illustrating one of the permanent ends of my car construction.

Fig. 3 is a perspective view of a detailed typical structural connection between the under-frame and the end structures.

Fig. 4 is an enlarged cross sectional top view of a part of the under-frame taken on line 4—4 of Fig. 1, and illustrating the arrangement of the car coupling.

Fig. 5 is a sectional view in elevation taken on line 5—5 of Fig 4.

Fig. 6 is a sectional view taken on line 6—6 of Fig. 4.

Fig. 7 is a partial detail view of the closed side of the car.

Fig. 8 is a sectional view taken on line 8—8 of Fig. 7.

Fig. 9 illustrates a modified car construction, the sidings of which are made of corrugated material.

Fig. 10 is a similar car construction showing a greater number of corrugated siding sections.

Figs. 11 and 12 illustrate cars with slidable, door-like sidings, the latter figure being a cross sectional view taken on line 12—12 of Fig. 11.

Fig. 13 is a cross sectional detail view taken on line 13—13 of Fig. 11.

Fig. 14 represents cross sectional views of various posts fixed for different sidings.

Figs. 15 and 16 illustrate similar views to that shown in Figs. 7 and 8 of modified form.

In the drawings car trucks or carriages 10 are indicated in broken lines, whereupon rests the car under-frame preferably composed of a plurality of longitudinal channel shaped members 11, 11' and 11'' comprising the intermediate, side and center sills, respectively, and transverse channel members 12, 12' and 12'' rigidly joined together and forming a substantially closed rectangular structure. Between the longitudinal inner members 11'' are lodged at both ends of the car, preferably wooden blocks 13 which are bolted or otherwise fastened to floor 14 secured in any desired conventional way to the under-frame. To blocks 13 are fastened conventional car couplings indicated at 15 extending in the usual way beyond the under-frame. At the place where the couplings protrude, the outer transverse frame members 12' are provided with openings or cut-outs and in rear of the blocks 13 are transverse brace members 12'' reinforcing the longitudinal members. Car coupling 15 is held within block 13 by means of pin 15' or in any other convenient manner.

Rigidly connected with end members 12' and longitudinal members 11, 11' and 11'' are upright channels 16 forming part of the end structures of the car. They are held together by smaller channels 17 disposed horizontally and with their legs facing outward.

Attached to these channels 17 are the fillings or walls 18 made of any suitable material, preferably of sheet metal or wood, and are placed between the upright channels 16.

Diagonal stays 19 impart to the end structure greater rigidity.

At the upper portion of the uprights 16, a gabled truss roof is attached which is composed of longitudinal channel-formed members 20 and 21 reinforced by transverse channel members 22.

On top of members 22 a conventional roofing 23 is provided.

The roof, the ends and the under-frame form a rigid car structure, the sides of which are normally open and which may be closed when desired.

For this purpose removable blocking and sidings are provided, the construction of which may vary according to the purpose for which the car is to be used.

In order to facilitate lading of cargo from both sides and at any point of the car, there must not be any obstruction of any kind preventing the convenient handling of the freight.

The advantage of lading from both car sides is quite obvious in view of the usually cramped lading spaces at piers or railroad stations.

Moreover a great deal of time is saved through the possibilty of employing freight handlers at both sides and at either end of the car, whereby cargo may be stored in the car or taken therefrom simultaneously. There is to be ample space for moving about and without interfering with each other's work.

In order to accomplish the desired results, I have devised means whereby all obstructions to moving freight into or from the entire sides thereof may be removed or replaced without difficulties.

I have provided at the outer roof members 21, and at the roof trusses 22, a series of open brackets 24, and 24', respectively, and at the outer under-frame members 11', and within floor 14 a similar number of pocket-like brackets 25, and 25', disposed vertically below the respective brackets.

Where sidings or car doors alone are used (without blockings within the car for keeping the cargo from shifting) there are provided outer studs, stays, braces or posts made to fit into outer brackets 24 and 25 and are designed so as to not only be easily removable, but also to serve as guides or clamps for the various sidings or doors employed. Moreover they are made preferably in such a way as to prevent the shifting cargo from interfering with the opening of the car.

One of the many possible forms of these posts is shown in Figs. 7 and 8. They are made of one outer straight member 26 and an inner, channel-like member 27, both of which members forming a sort of clamp in which a board siding 28 may be securely held.

When using this kind of sidings, the stud 27 is first slipped into upper bracket 24 and then allowed to enter lower socket 25. Thereafter sections of the siding 28, held conveniently together by plates 29, are placed in the channel-like space of members 27, whereafter member 26 is secured in the sockets 24 and 25 in a similar way as was member 27.

When other kinds of sidings are employed as shown in Figs. 9 to 13, the shape or design of the removable studs is adapted for the particular use. The illustrations in Figs. 9 and 10 disclose rolling, corrugated sheets 30 in various sized sections. The removable studs 31 in this case form guides 31' for the sides of the sliding ends of the sheets (see Fig. 14). In Figs. 11 to 13 is shown another type of sidings resembling sliding or rolling doors 32, which may be shoved together and then swung out in the manner illustrated in Fig. 13, or they may be otherwise removed so as not to interfere with the lading of the car. In this construction the removable studs 33 serve as space fillers at the joining points of doors 32, and are provided with longitudinal slots 33'. (Fig. 14.)

There are of course any number of various siding constructions possible, and the braces or studs may be designed accordingly.

In the foregoing the term "blocking" was used. In order to elucidate its meaning, the illustrations of Figs. 15 and 16 may be consulted.

It often happens that cargo of various size and nature is to be transported in one car in which case it is almost impossible to load and group the different articles in such a way as to prevent their shifting during transportation, which invariably causes the jamming of the doors or sidings and makes difficult their opening.

To overcome these and similar obstacles I have provided means whereby the freight is prevented from coming in contact with the sidings.

As has been said before, brackets 24' are conveniently attached to roof members 22 while in the floor 14 pockets 25' are provided. Fitting therein are removable posts 34 which may be made either of flat iron, wood or in any other suitable way. These posts 34 are disposed within the car so as to leave a space between them and the sidings.

Against the posts are placed from within blockings, preferably composed of board sections 28' held together by plates 29' similar to the outer sidings shown in the previous figures.

When employing blocking in lading the cars, a few sections are placed at the car ends against bars 34 and made to rest on the floor. Then the freight is loaded against the board sections so that the cargo holds them in their place. Then another section is added above the lower already placed sections, and the freight is again thrust against this upper blocking. Gradually new sections are added in the direction toward the center of the car, and freight is deposited in the above indicated manner until the entire car is filled.

It is obvious that the uppermost space of the car can not be provided with boards and that at least one upper section at the center of the car will have to be omitted on one side, when the loading is started simultaneously from both car ends.

The majority of the cargo will be, however, fully held in place against shifting toward the sidings, thereby assuring its unobstructed opening.

In Fig. 14 various sections of outer posts are shown each provided with a rib 35 adapted to face the inside of the car. When large, uniform and heavy parcels are loaded they may be placed against these ribs or against the inner stud members 27 illustrated in Fig. 8. In this manner the interference of shifting freight with the opening of the sidings is eliminated, or at least greatly reduced.

It is obvious that boards fitting between the outer posts and placed against ribs 35 may be employed and the freight thrust against them.

In any event and when using any of the shown devices for closing the sides of the car and keeping the cargo from shifting, all of the side structures are made entirely removable or disappearing so as to clear every point of the car sides for loading and unloading purposes.

Referring to Figs. 4, 5 and 6 illustrating besides other things the arrangement of couplings and their connection with the car flooring, it may be said that this construction is an essential part of my invention. Its advantage becomes particularly prominent in cases of collisions. It is well known that when the car couplings are made parts of the rigid, strong under-frame, the entire end structures of the car will crumble, thereby damaging the car to uselessness. When, however, the coupling is connected in the manner I have shown, such damage is localized to the flooring which may be easily replaced.

Having thus described my invention, I claim:

1. In a railway car, composed of a permanent frame construction comprising an under-frame, end frames and a roof frame, said frames rigidly connected with each other and having substantially open sides, a plurality of pocket-like sockets provided in the floor and at the under-frame, a plurality of open brackets provided at the roof frame and disposed opposite to and alined with said sockets, removable posts adapted to engage the said sockets and brackets, sectional blockings held in place by said posts within the car and adapted to prevent cargo from shifting against car doors, thus facilitating their closing and opening.

2. In a railway car having removable outer side doors and inner cargo blockings, a permanent frame construction comprising a rigid under-frame adapted to be attached to car trucks, rigid end frames and a rigid roof frame, a plurality of studs disposed vertically within the car, and removably held in sockets at top and bottom, and adapted to prevent said blockings from interfering with the operation of said doors when cargo is carried in the car.

3. In a railway car, a car body construction, comprising in combination, a truss roof composed of transverse channel members and a plurality of longitudinal plate and angle members, structural steel end-walls rigidly connected with the said longitudinal members, an under-frame of channel and angle construction, rigidly joined with the said end-walls and provided with a floor, receiving means attached to the roof and other receiving means provided in the floor and at the sides of said under-frame, a plurality of studs adapted to be held in said receiving means, said studs having inner and outer portions and adapted to receive between them sidings.

4. A car body construction comprising in combination, a permanently closed truss roof, structural steel end walls adapted to be permanently closed, a structural steel under-frame, a flooring resting upon and secured to said under-frame, said roof, end-walls and under-frame forming a rigid structure leaving open sides, a plurality of removable studs extending from the roof to the flooring and disposed within the car body, sockets for engaging the ends of said studs removable sectional blockings thrust against said studs, said blockings adapted to keep cargo from shifting against the car doors, thus facilitating their closing and opening.

5. In a car body, the combination of an under-frame, end-walls and a roof construction forming a permanent car skeleton, removable blockings and sidings for preventing cargo from shifting, and for closing or entirely opening the sides of the car body respectively, both facilitating free loading of the car, removable means disposed between the roof and under-frame and held within suitable sockets for reinforcing said blockings when the car body is closed, and for preventing shifting cargo within the car from interfering with the opening of the sidings.

6. A car construction for facilitating freely loading from all points at both sides of the car, which comprises, a permanent rigid skeleton structure closed at the roof, bottom and ends and open at both sides, removable cargo blockings, removable means engaging sockets provided at both the roof and bottom facilitating, when removed, the free loading of the car, and providing, when in place, side supports for said blockings, removable sidings for closing the car, said blockings preventing loaded cargo from shifting against said sidings.

Signed at New York, in the county of New York, and State of New York, this 21 day of September A. D. 1920.

THOMAS J. CALLERY.